3,262,474
HOLE SAW ASSEMBLY
Sherwood G. Enders, Bowley's Quarters, Md., assignor to The Black and Decker Manufacturing Company, Towson, Md., a corporation of Maryland
Filed Mar. 11, 1964, Ser. No. 351,078
14 Claims. (Cl. 143—85)

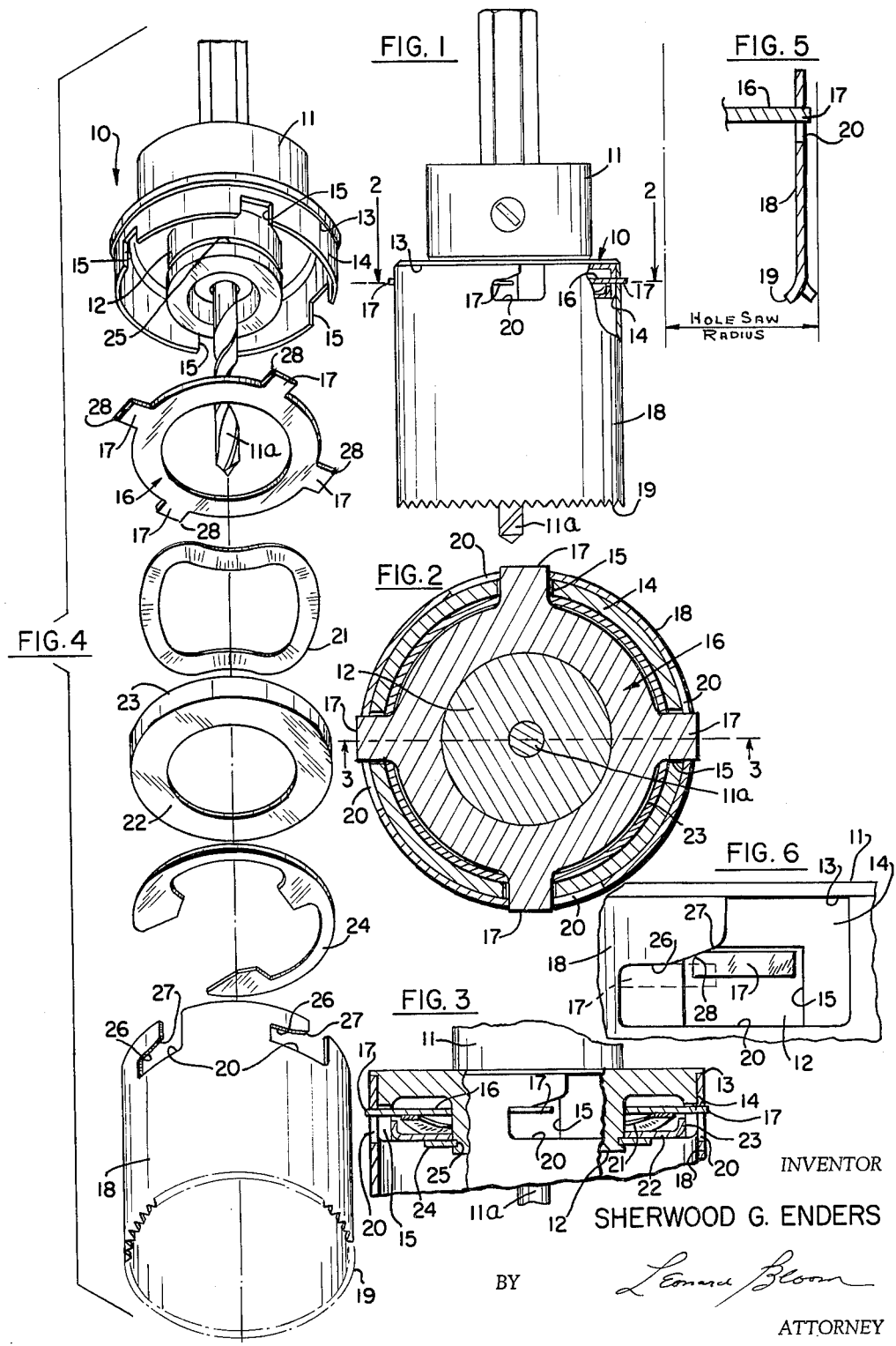
July 26, 1966  S. G. ENDERS  3,262,474
HOLE SAW ASSEMBLY
Filed March 11, 1964
INVENTOR
SHERWOOD G. ENDERS
BY Leonard Bloom
ATTORNEY

# United States Patent Office 3,262,474
Patented July 26, 1966

The present invention relates to a hole saw assembly, and more particularly, to one in which a tubular replaceable hole saw blade is resiliently mounted to a driving body.

It is an object of the present invention to provide a bayonet connection means between a driving body member and a tubular replaceable hole saw blade member, the bayonet connection means comprising at least one drive lug carried by one of the members and a cooperating bayonet slot formed in the other member, in combination with resilient means generating an axial force which constantly urges the drive element towards the bottom of its cooperating bayonet slot.

It is another object of the present invention to provide a means carried by the hole saw assembly for preventing the resilient means from becoming overstressed.

It is yet another object of the present invention to provide a camming means, one which acts in opposition to the resilient means, to separate the drive lug by a slight amount from the bottom of a cooperating axial slot formed in the driving body member, such that the axial thrust loads imparted to the hole saw blade are absorbed by an annular shoulder formed on the driving body member.

It is a further object of the present invention to provide a commercially-practical hole saw blade assembly having a resiliently-mounted tubular replaceable blade, one which is rugged and reliable for extended usage under severe conditions, yet is relatively inexpensive to manufacture, and one in which the blade, when worn, may be easily and conveniently replaced by the user.

In accordance with the broad teachings of the present invention, a hole saw assembly is herein illustrated and described, which comprises a driving body and a drive member carried by the body and having at least one drive element projecting radially of the body. A tubular hole saw blade having cutting means formed along its exposed edge is provided. The blade is replaceably mounted to the driving body by means of a peripheral bayonet slot formed in the blade to receive the drive element; and yieldable means are provided, one which generates an axial force in a direction away from the cutting means on the blade, to constantly urge the drive element towards the bottom of its peripheral bayonet slot.

In accordance with the further teachings of the present invention, a whole saw assembly is herein illustrated and described, which comprises a driving body member having an annular shoulder and a cylindrical flange portion extending therefrom. A tubular hole saw blade member is received upon the cylindrical flange portion of the driving body and is seated against the annular shoulder. The blade has a plurality of suitable cutting teeth formed along its exposed edge. A bayonet connection means is provided to replaceably mount the blade to the driving body, and this means comprises at least one drive lug carried by one of the members and a cooperating bayonet slot formed in the other member. A resilient means is provided which generates an axial force in a direction away from the cutting teeth on the blade so as to constantly urge the drive lug towards the bottom of its cooperating bayonet slot. The bayonet connection means further includes a camming means, which acts in opposition to the resilient means, so as to separate the drive lug by a slight amount from the bottom of a cooperating axial slot formed in the driving body member, such that the axial thrust loads imparted to the hole saw blade are absorbed by the annular shoulder on the driving body.

A preferred embodiment of a hole saw assembly is herein illustrated and described, and the assembly includes a substantially-cylindrical driving body which comprises a shank portion, an annular shoulder, and a cylindrical flange portion extending from the shoulder. A plurality of circumferentially-spaced axial slots are formed in the cylindrical flange portion of the driving body. An intermediate drive member comprising a drive washer is carried by the body, and the drive washer has a corresponding plurality of circumferentially-spaced drive lugs; these drive lugs are slidably guided in the respective axial slots in the cylindrical flange portion of the driving body and project radially of the flange. A tubular hole saw blade is received upon the cylindrical flange and is seated against the annular shoulder, and a series of cutting teeth are formed along the exposed edge of the blade. The hole saw blade has a corresponding plurality of circumferentially-spaced peripheral bayonet slots which receive the respective drive lugs, thereby replaceably mounting the blade to the driving body. A resilient means is provided which generates an axial force in a direction away from the cutting teeth of the blade so as to constantly urge the drive lugs towards the bottoms of their respective cooperating bayonet slots. Means are provided, preferably comprising a washer having a peripheral flange which encloses the resilient means, to prevent the resilient means from becoming overstressed during the operation of the hole saw assembly; and retaining means are further provided, preferably comprising a resilient split ring seated in an external annular groove formed in the shank portion of the body member, to hold the assembly together.

These and other objects of the present invention will become apparent from a reading of the following specification, taken in conjunction with the enclosed drawings, in which:

FIGURE 1 is an elevation of the complete hole saw blade assembly with part of the tubular replaceable blade being broken away and sectioned to illustrate one of the drive lugs received within a peripheral bayonet slot formed in the blade member;

FIGURE 2 is a section view taken along the lines 2—2 of FIGURE 1 and enlarged slightly over the scale of FIGURE 1;

FIGURE 3 is a section view taken along the lines 3—3 of FIGURE 2;

FIGURE 4 is an exploded perspective showing, in sequence, the driving body member, the drive washer with its radially-projecting drive lugs, the spring washer, the protective washer with its peripheral flange, the split ring for retaining the assembly, and the tubular replaceable hole saw blade having a plurality of circumferentially-spaced peripheral bayonet slots which receive the respective lugs of the drive washer;

FIGURE 5 is a detail view corresponding to a portion of FIGURE 1 and illustrating that the cutting radius of the hole saw blade preferably extends beyond the radially-projecting drive lug; and FIGURE 6 is an enlarged portion of FIGURE 1 illustrating the camming surface on the bottom of each bayonet slot so as to retract each drive lug axially by a slight amount from the bottom of the respective axial slots formed in the cylindrical flange portion of the body member.

With reference to the drawings, the hole saw assembly 10 includes a substantially-cylindrical driving body member 11 having a pilot drill 11a; the driving body 11 may be of conventional structure and design, but preferably includes a shank portion 12, an annular shoulder 13, and a cylindrical flange portion 14 extending from the shoulder. The cylindrical flange portion 14 has a plurality of circumferentially-spaced axial slots 15. A drive washer 16 is slidably received over the shank portion 12 of the driving body member 11, and the drive washer 16 has a corresponding plurality of circumferentially-spaced drive elements or lugs 17; these drive lugs 17 are slidably guided, see FIGURE 3, in the respective axial slots 15 of the cylindrical flange portion 14 of the driving body member 11 and project radially, see FIGURES 1 and 3, beyond the cylindrical flange 14.

A tubular hole saw blade 18 is received upon the cylindrical flange 14 and is seated against the annular shoulder 13. The hole saw blade 18 has a series of suitable cutting teeth 19 formed along its exposed edge. The blade 18 further has a corresponding plurality of circumferentially-spaced peripheral bayonet slots 20 which receive the respective drive lugs 17 of the drive washer 16, see FIGURES 1 and 4, thereby replaceably mounting the hole saw blade 18 to the driving body 11.

The hole saw blade 18 is resiliently mounted to the driving body 11 by a suitable resilient means, which preferably comprises a spring washer 21 that is guided over the shank 12 and bears against the exposed face or side of the drive washer 16. The spring washer 21 generates an axial force in a direction away from the cutting teeth 19 of the hole saw blade 18, so as to constantly urge the drive lugs 17 towards the bottoms of their respective cooperating bayonet slots 20. In the preferred embodiment, the spring washer 21 is an arcuately-formed washer known in the art as a "wavy" washer, although it will be appreciated that other forms of spring washers (and indeed other resilient means) are equally applicable within the teachings of the present invention.

A washer member 22 is slidably fitted over the shank 12 of the driving body 11, and the washer member 22 is provided with a peripheral flange portion 23 which, see FIGURE 3, radially encloses the spring washer 21. The flange 23 normally has a slight axial clearance with respect to the exposed face of the drive washer 16, but will engage the face of the drive washer to prevent the resilient means from becoming overstressed during the operation of the hole saw assembly 10, and more particularly, to prevent any "bottoming" which would fully compress the spring washer 21. In the preferred embodiment, the washer member 22 is a drawn "cup" type of washer although it will be appreciated by those skilled in the art that other configurations are equally applicable to the teachings of the present invention.

Suitable means are provided to retain the components of the hole saw assembly 10; preferably, this means comprises a split ring 24 which is seated within an external annular groove 25 formed in the shank portion 12 of the driving body member 11. In the preferred embodiment, the split ring 24 is a resilient "snap" ring that is received within the external annular groove 25 formed on the driving body member 11; if desired, the ring could be received within an internal annular groove on the driving body, it being appreciated that such a structure, as well as other retaining means, may be used in conjunction with the teachings of the present invention.

With reference to FIGURE 5, it will be observed that the cutting radius of the hole saw blade 18 is preferably greater than the radius of the drive washer 16 as measured from its center line to the outermost edge of a drive lug 17; this will allow the hole saw assembly 10 to pass freely through a hole which is cut in a workpiece because the drive lugs 17 (indeed, any part of the drive mechanism) preferably do not extend radially beyond the set of the cutting teeth 19 formed on the hole saw blade 18.

With reference to FIGURE 6, the bottom 26 of each bayonet slot 19 is provided with a cam surface 27 which, as the hole saw blade 18 is locked to the driving body 11, initially engages the respective drive lug 17 and lifts it slightly in an axial direction away from the bottom of its respective axial guide slot 15 formed in the cylindrical flange 14 of the driving body member 11; this insures that the axial thrust loads imparted upon the hole saw blade 18 are taken up or absorbed against the annular shoulder 13 of the driving body member 11, rather than against the drive lugs 17. Preferably, the corner of each drive lug 17 is rounded off as at 28, so as to insure that no burrs will be formed on the cam surface 27, thereby rendering the locking operation smooth and reliable.

Obviously, many modifications may be made without departing from the basic spirit of the present invention; and accordingly, within the scope of the appended claims, the invention may be practiced other than has been specifically described herein.

I claim:
1. A hole saw assembly, comprising:
 (a) a rotating driving body;
 (b) an intermediate drive member slidably mounted, axially, on said driving body and keyed thereto for conjoint rotation, said member having at least one drive element projecting radially of said body;
 (c) a tubular hole saw blade having cutting means formed along its exposed edge;
 (d) means to replaceably mount said blade upon said driving body, said means comprising a peripheral bayonet slot formed in said blade to receive said drive element of said member, thereby driving said blade; and
 (e) resilient means exerting an axial force on said intermediate drive member in a direction away from said cutting means, thereby constantly urging said drive element towards the bottom of said bayonet slot.

2. A hole saw assembly, comprising:
 (a) a rotating driving body;
 (b) an intermediate drive member slidably mounted, axially, on said driving body and keyed thereto for conjoint rotation, said member having a plurality of circumferentially-spaced drive elements projecting radially of said body;
 (c) a driven tubular hole saw blade replaceably mounted upon said driving body and having a corresponding plurality of circumferentially-spaced peripheral bayonet slots which receive said respective drive elements; said blade having an exposed edge with cutting teeth formed thereon; and
 (d) resilient means exerting an axial force on said intermediate drive member in a direction away from the cutting teeth on the blade, thereby constantly urging said drive elements towards the bottoms of said respective slots.

3. A hole saw assembly, comprising:
 (a) a driving body having a cylindrical portion formed with a plurality of circumferentially-spaced axial slots;
 (b) a drive washer carried by said body and having a corresponding plurality of circumferentially-spaced drive lugs slidably guided in said respective axial slots and projecting radially of said cylindrical portion of said body;
 (c) a tubular hole saw blade replaceably mounted upon said cylindrical portion of said driving body and having a corresponding plurality of circumferentially-spaced peripheral bayonet slots which receive said respective drive lugs; and
 (d) resilient means generating an axial force which constantly urges said lugs towards the bottoms of said respective bayonet slots.

4. A hole saw assembly, comprising:
 (a) a driving body member having an annular shoulder and a cylindrical flange portion extending therefrom;

(b) a tubular hole saw blade member received upon said cylindrical flange portion of said driving body and seated against said annular shoulder, said blade having a plurality of cutting teeth formed along its exposed edge;

(c) bayonet connection means between said hole saw blade member and said driving body member, said means comprising at least one drive lug slidably mounted in an axial slot in said driving body, and a cooperating bayonet slot formed in the hole saw blade, whereby said blade is replaceably mounted on said driving body;

(d) resilient means generating an axial force in a direction away from said cutting teeth to constantly urge said drive lug towards the bottom of said bayonet slot; and (e) said bayonet connection means having camming means acting in opposition to said resilient means to separate said drive lug by a slight amount from the bottom of said axial slot in said driving body, whereby the axial thrust loads imparted to said hole saw blade are absorbed by said annular shoulder on said driving body.

5. A hole saw assembly, comprising:

(a) a rotating driving body having an intermediate driving member slidably mounted, axially, thereon and keyed thereto for conjoint rotation;

(b) a tubular hole saw blade member having an exposed edge with cutting teeth formed thereon;

(c) bayonet connection means between said blade member and said intermediate driving member to replaceably mount said blade to said body, thereby driving said blade member; said means comprising at least one drive lug carried by one of the members, and a cooperating bayonet slot formed in the other member;

(d) resilient means exerting an axial force on said intermediate drive member in a direction away from the cutting teeth on the blade, thereby constantly urging said drive lug towards the bottom of said bayonet slot; and (e) means carried by the assembly for preventing said resilient means from being overstressed.

6. A hole saw assembly, comprising:

(a) a substantially-cylindrical driving body comprising a shank portion, an annular shoulder, and a cylindrical flange portion extending from said shoulder;

(b) a plurality of circumferentially-spaced axial slots formed in said cylindrical flange portion of said driving body;

(c) a drive washer carried by said body and having a corresponding plurality of circumferentially-spaced drive lugs slidably guided in said respective axial slots and projecting radially of said cylindrical flange portion of said driving body;

(d) a tubular hole saw blade received upon said cylindrical flange and seated against said annular shoulder, said blade having cutting teeth formed along its exposed edge;

(e) said hole saw blade having a corresponding plurality of circumferentially-spaced peripheral bayonet slots which receive said respective drive lugs, thereby replaceably mounting said blade to said driving body;

(f) resilient means generating an axial force in a direction away from said cutting teeth of said blade for constantly urging said drive lugs towards the bottoms of said respective bayonet slots;

(g) means for preventing said resilient means from being overstressed; and (h) means for retaining said drive washer, said resilient means, and said last-named means to said shank portion of said driving body.

7. The hole saw assembly of claim 6, wherein:

(a) said drive washer is radially positioned between said shank portion and said cylindrical flange portion of said driving body.

8. The hole saw assembly of claim 6, wherein said resilient means comprises:

(a) a spring washer slidably fitted over said shank portion of said driving body and bearing against the exposed face of said drive washer.

9. The hole saw assembly of claim 6, wherein said means for preventing said resilient means from being overstressed, comprises:

(a) a washer member slidably fitted over said shank portion of said driving body and having a peripheral flange portion;

(b) said flange portion radially enclosing said resilient means and engaging the exposed face of said drive washer to prevent said resilient means from being fully compressed;

(c) said washer member being positioned axially between said drive washer and said retaining means.

10. The hole saw assembly of claim 6, wherein said retaining means comprises:

(a) a split retaining ring seated in an external annular groove formed in said shank portion of said driving body.

11. The hole saw assembly of claim 6, wherein camming means acting in opposition to said resilient means is provided to separate said drive lugs by a slight amount from the bottoms of said respective axial slots, said camming means comprising:

(a) a cam surface formed on the bottom of each of said peripheral bayonet slots;

(b) whereby said cam surface initially engages said respective drive lug and lifts it slightly in a direction away from the bottom of said respective axial slot as said tubular hole saw blade is mounted upon and locked to said driving body.

12. The hole saw assembly of claim 6, wherein:

(a) said cutting teeth of said hole saw blade have a cutting radius which is greater than the radius of said drive washer measured from its center to the outer edge of a radially-projecting drive lug.

13. A hole saw assembly, comprising:

(a) a rotating driving body having an annular shoulder and a cylindrical flange portion extending therefrom;

(b) an intermediate driving member slidably mounted, axially, on the body and keyed thereto for conjoint rotation;

(c) a tubular hole saw blade member received upon said cylindrical flange portion and seated against said annular shoulder of said driving body member; said blade having an exposed edge with cutting teeth formed thereon;

(d) bayonet connection means between said hole saw blade member and said intermediate driving member, said means comprising a driving element carried by one of the members and a cooperating bayonet slot formed in the other member;

(e) resilient means constantly urging said intermediate driving member in an axial direction away from the teeth on the blade, thereby constantly urging said driving element towards the bottom of its cooperating bayonet slot; and (f) whereby rotative loads are imparted to the bayonet connection means, and axial thrust loads are taken up by the annular shoulder.

14. In a hole saw assembly of the type comprising a rotating driving body and a tubular replaceable hole saw blade having cutting teeth formed thereon, a driving means between the body and the blade, comprising:

(a) a drive washer slidably mounted, axially, on the body and keyed thereto for conjoint rotation;

(b) said washer having at least one radially-extending drive lug;
(c) a peripheral bayonet slot formed in the blade to cooperate with said lug;
(d) said blade being provided with set teeth having a cutting radius greater than the radius of said washer measured to the outer edge of its drive lug; and
(e) resilient means constantly urging the drive washer in an axial direction away from the cutting teeth on the blade, thereby constantly urging the drive lug towards the bottom of the bayonet slot.

References Cited by the Examiner

UNITED STATES PATENTS

| | | | |
|---|---|---|---|
| 58,924 | 10/1866 | Webster | 77—69 |
| 2,079,460 | 5/1937 | Marty | 287—103 X |
| 2,448,548 | 9/1948 | Purdy | 287—103 |
| 2,591,516 | 4/1952 | Darnell | 145—120 X |
| 3,162,067 | 12/1964 | Koons et al. | 143—85 X |

DONALD R. SCHRAN, *Primary Examiner.*